March 6, 1956 J. W. SIBLEY 2,736,952
BATTERY DISMANTLING MACHINE
Original Filed June 15, 1946 4 Sheets-Sheet 1

INVENTOR.
JAMES W. SIBLEY.
BY
Robert A. Sloman
ATTORNEY.

March 6, 1956  J. W. SIBLEY  2,736,952
BATTERY DISMANTLING MACHINE
Original Filed June 15, 1946  4 Sheets-Sheet 2
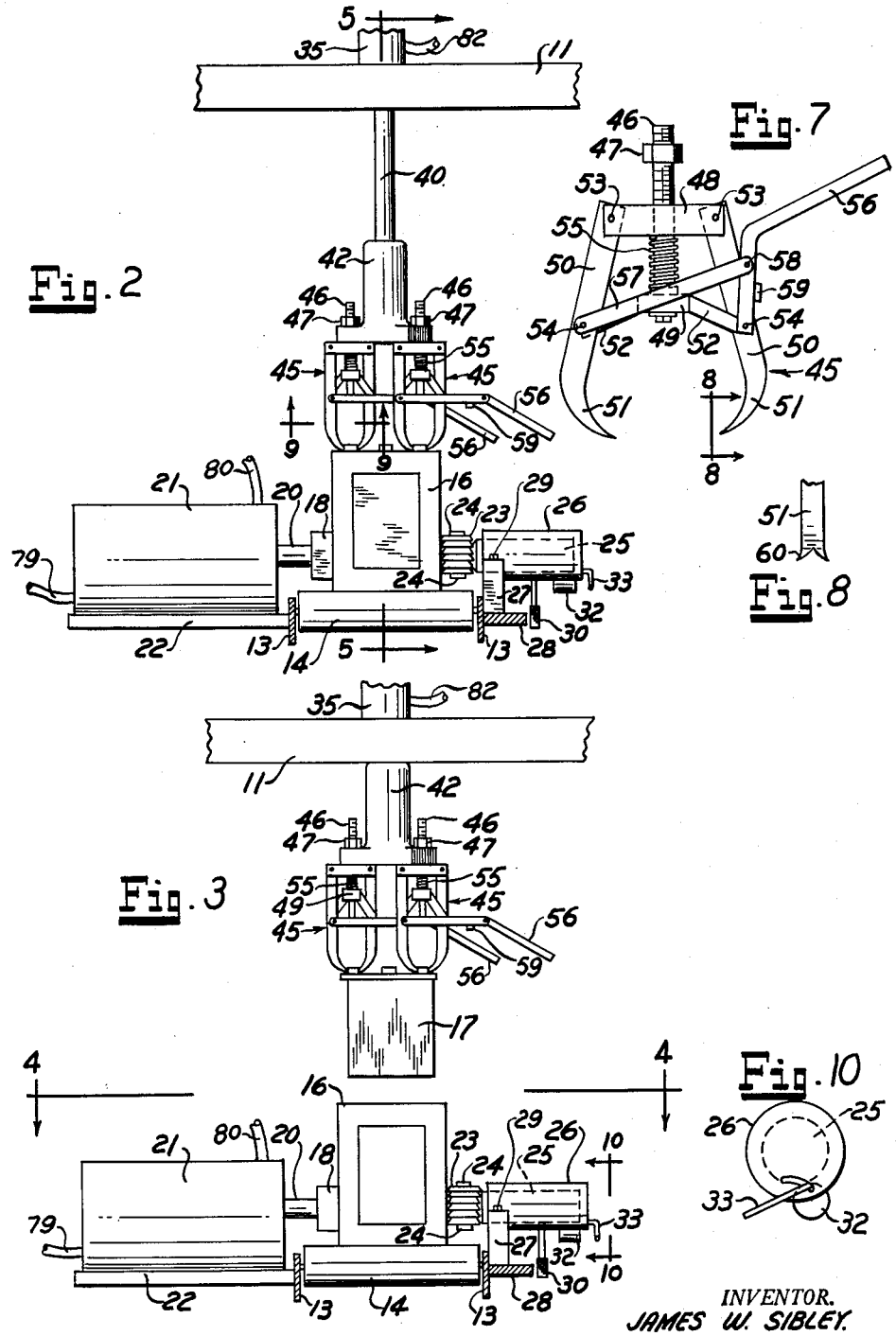
INVENTOR.
JAMES W. SIBLEY.
BY
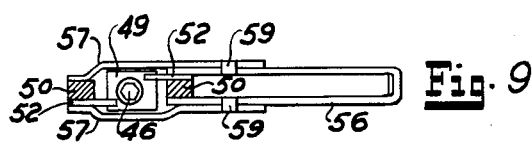
ATTORNEY.

INVENTOR.
JAMES W. SIBLEY.
BY
Robert A. Sloman
ATTORNEY.

March 6, 1956  J. W. SIBLEY  2,736,952

BATTERY DISMANTLING MACHINE

Original Filed June 15, 1946  4 Sheets-Sheet 4

INVENTOR.
JAMES W. SIBLEY.

BY Robert A. Sloman
ATTORNEY.

United States Patent Office 2,736,952
Patented Mar. 6, 1956

2,736,952

BATTERY DISMANTLING MACHINE

James W. Sibley, Detroit, Mich., assignor to Michigan Lead Company, Detroit, Mich., a corporation of Michigan Continuation of application Serial No. 676,946, June 15, 1946. This application January 30, 1952, Serial No. 268,978

1 Claim. (Cl. 29—204)

This application is a continuation of my copending application Serial No. 676,946, filed June 15, 1946, now abandoned.

This invention relates to a battery dismantling machine, and more particularly to a device for removing the cells from a storage battery.

It is the object of this invention to provide a labor saving apparatus for simultaneously removing the cells from a lead-acid storage battery, said removal being for the purpose of examining the several cells, or more generally, for the salvage of the metallic content thereof.

It is the object of this invention to provide novel hydraulic means for clamping a battery case in a fixed position, and further hydraulic means for forcibly lifting the cells from the battery casing.

It is the further object of this invention to provide a hydraulically adjustable cylinder controlled vise and in conjunction therewith a vertically suspended swinging cylinder, together with suitable hooks joined to the reciprocal portion thereof for grasping the battery cells as by their connectors or by the terminals.

It is the further object of this invention to provide knee actuated controls for the hydraulic means employed for energizing the vise cylinder as well as the cell lifting cylinder, whereby the operator's hands are free for attaching and detaching the lifting hooks to the battery cells.

These and other objects will be seen from the following specification and claim in conjunction with the appended drawings in which:

Figure 2 is a fragmentary elevational partially sectioned view illustrating the battery gripped in position, and with the lifting hooks engaging the battery cell connectors.

Figure 3 is a similar view showing the cells removed from the battery case.

Figure 7 is an enlarged elevational view of one of the lifting hooks shown in open position.

Figure 8 is a fragmentary elevational section taken on line 8—8 of Fig. 7.

Figure 9 is a bottom plan section on line 9—9 of the hook shown in Fig. 2.

Figure 10 is an enlarged right end view of the battery grip shown in Fig. 3.

It will be understood that the above drawings illustrate merely one preferable embodiment of the invention, and that other embodiments are contemplated within the scope of the claims hereafter set out.

Figure 1:
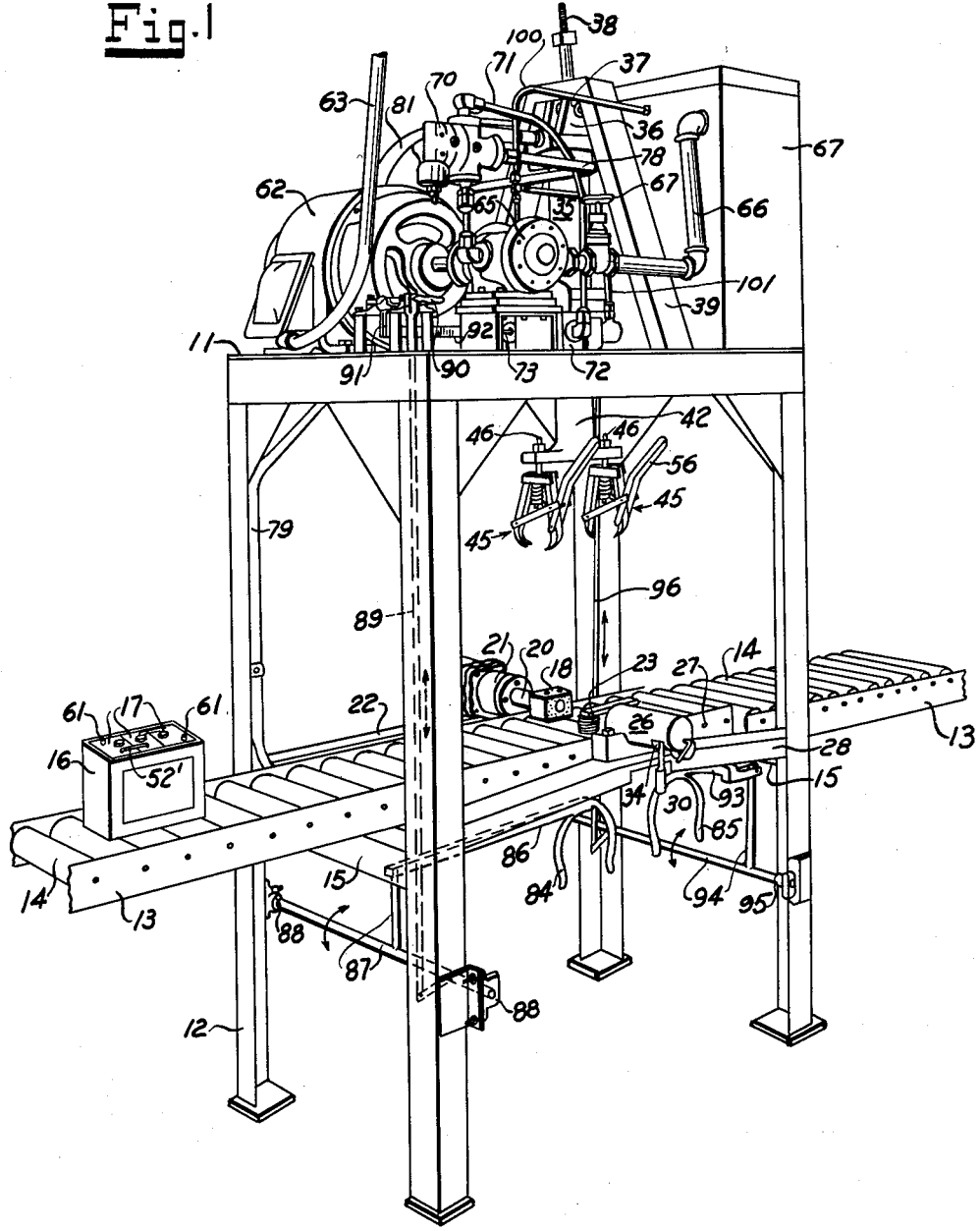
Figure 1 is a perspective view of the battery dismantling machine.

Referring to the drawings Fig. 1, the battery dismantling machine consists of a horizontal hydraulic unit supporting platform 11 with four spaced legs 12.

Conveyor 13 with rollers 14 is shown fragmentarily extending between legs 12 and resting upon cross bars 15 secured thereto.

Battery case 16 has just been ejected from a pre-heating oven forming no part of the present invention, but which is employed to soften the sealing compound normally used in securing cells 17 within said battery case.

Preferably the battery is heated up to approximately 700 or 800 degrees F., which greatly facilitates the removal of cells 17 without destruction or mutilation of case 16.

The battery travels along on conveyor rollers 14 and is positioned centrally under platform 11 where it is suitably secured on opposite sides by hydraulic actuated vise grip 18, and relatively stationary vise grips 23.

Figure 11:
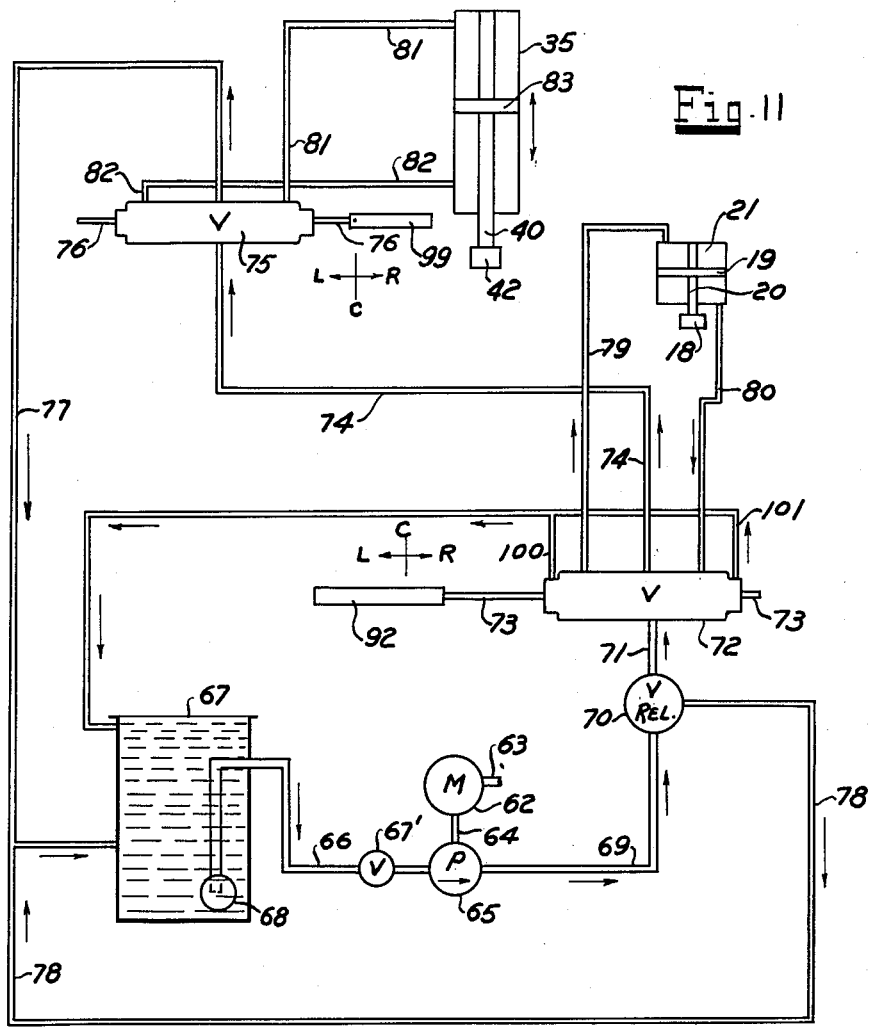
Figure 11 is a diagrammatic view of the hydraulic connections employed in the battery dismantling machine shown in Fig. 1.

Movable grip 18 is secured on the end of piston rod 20, which extends centrally from within hydraulic cylinder 21 best illustrated in Fig. 11. Cylinder 21 is suitably secured by a bracket not shown, to the horizontal cross brace 22 interposed and secured between legs 12.

Figure 4:
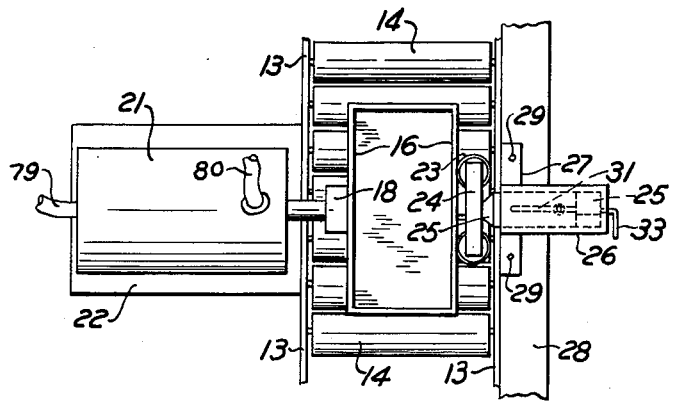
Figure 4 is a plan section on line 4—4 of Fig. 3.

Referring to Figures 2, 3 and 4, battery 16 is shown in position upon rollers 14 of conveyor 13, with grip 18 operatively engaging one side thereof. The opposite side wall of battery 16 is operatively engaged by the spaced roller jaws 23, rotatably mounted between spaced cross bars 24, which are centrally secured upon the end of adjusting cylinder 25, Fig. 4. The latter is slidably mounted within stationary hollow cylindrical member 26, which is suitably secured as by welding to supporting bracket 27. The latter is immovably secured upon cross bar 28 by bolts 29.

For normal operation cylinder 25 abuts the outer end of cylinder housing 26, so that roller grips 23 are positioned as shown in Figures 2, 3 and 4. However, often times narrow batteries are encountered whose outer walls would normally be beyond the inwardly extended portion of hydraulic grip 18. And in that case roller grips 23 are adjusted inwardly by inwardly sliding cylinder 25 by its handle 30, which extends downwardly therefrom, and through a corresponding slot 31 in the bottom of cylindrical member 26.

Cylinder 25 is retained in this adjusted position by cylindrical disc 32, which is normally supported on the inner end of handle 33, which pivotally extends through the outer end of cylindrical member 26, Figures 2, 3, 4 and 10.

It will be noted that in the inoperative position shown in Figures 2, 3 and 10, disc 32 is clear of the cylindrical passage within hollow member 26, whereby cylinder 25 may be moved to its normal outer position.

Figure 6:
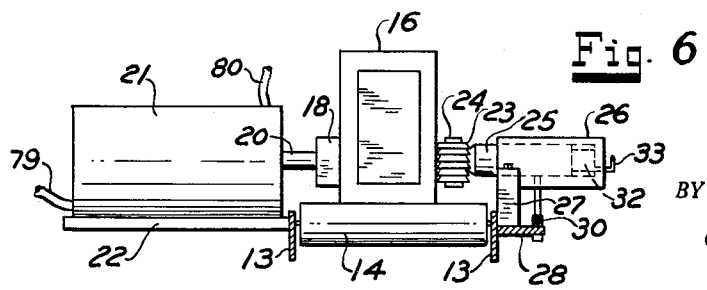
Figure 6 is a fragmentary elevational partially sectioned view of the battery gripping device shown in Fig. 2.

However, when cylinder 25 and roller grips 23 joined thereto are inwardly adjusted, Fig. 6, handle 33 is manually rotated, bringing disc 32 within cylindrical member 26 through an arcuate slot 34 Fig. 1 formed therein. The end walls of disc 32 thus abut respectively the end of member 26 and the outer end of cylinder 25 for locking the same in the position shown in Fig. 6.

Grips 23 are rotatable to permit easy longitudinal movement of the battery into and out of position for dismantling in the manner hereinafter set out.

Referring to Fig. 1, a vertically arranged cylinder 35 has a bifurcated supporting bracket 36 suitably secured upon its upper end. Swivel pin 37 extends through an opening in bracket 36 and is centrally supported by eye bolt 38 adjustably carried by standard 39 on platform 11.

Figure 5:
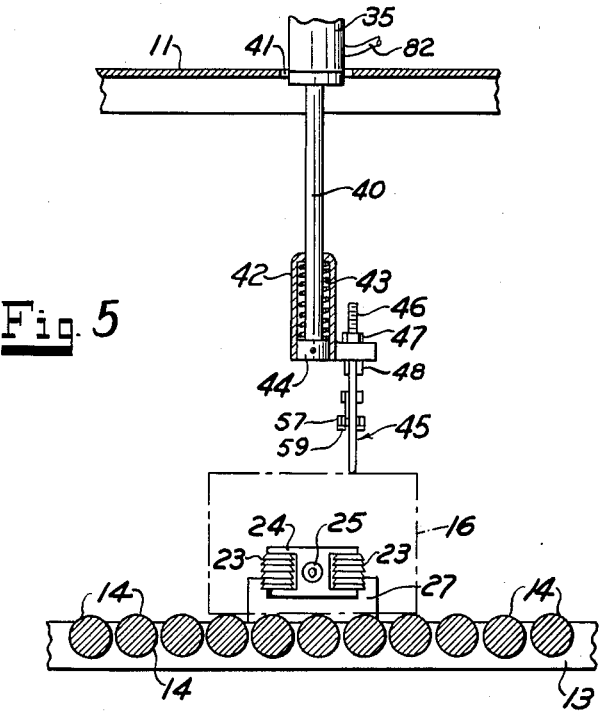
Figure 5 is an elevational section on line 5—5 of Fig. 2.

Cylinder 35 swingably mounted on eye bolt 38 and standard 39 has a vertically reciprocal piston 83, Fig. 11, therein, and a piston rod 40 joined thereto which projects downwardly from the bottom of cylinder 35 as illustrated in Fig. 5. It will be noted that the lower end of cylinder 35 extends loosely through opening 41 formed in platform 11.

The lower end of piston rod 40 slidably projects through an opening in hollow hook supporting swivel 42, there being a coil spring 43 positioned around said rod and interposed between the inner end of said swivel and a small piston 44 secured on the bottom of piston rod 40.

Spring 43 thus provides a resilient and yielding connection between swivel 42 and piston rod 40, whereby lifting pressure may be gradually transmitted to said swivel.

Hooks 45 are shown in Figures 1, 2, 3 and 5 are carried by swivel 42 in spaced relation to the two bolts 46, which are secured thereto by nuts 47. Referring to Figures 7 and 9, bolt 46 extends down through swivel 42 threadably engaging hook support 48, and is loosely joined at its end to anchor plate 49.

Oppositely arranged hook bars 50 have inwardly projecting hooks 51 at their lower ends, which are adapted to project under battery cell connectors 52', for gripping the same. Hook bars 50 are positioned within slots in support 48 and are pivotally mounted thereon at their upper ends by pins 53.

Links 52 are pivotally joined at their outer ends to central positions of bars 50 by pins 54. The inner ends of links 52 are also pivotally joined to opposite sides of plate 49; and a coil spring 55 is positioned around bolt 46 and interposed between said plate and support 48.

Bifurcated formed hook locking handle 56 extends downwardly over one of the bars 50 and is pivotally joined thereto by pins 54. A pair of spaced operating levers 57 are pivotally joined at one of their ends at 58 to handle 56. The other ends of said levers are pivotally joined to the other hook bar 50 by pins 54, whereby downward pivotal movement of handle 56 projects the two hooks 51 towards each other to assume the locking and lifting position shown in Fig. 3.

Referring to Figures 7 and 9, lugs 59 carried on handle 56 project outwardly, and are adapted to operatively engage the under sides of operating levers 57, when handle 56 is pivoted down into locked position as in Fig. 2, thereby limiting downward movement of said handle.

Spring 55 is compressed when hooks 51 are locked with plate 49 elevated on bolt 46, as illustrated in Figures 2 and 3. Consequently the unlocking of hooks 51 is facilitated by the expansive action of said spring acting on plate 49, as handle 56 is elevated to releasing position.

Referring to Figures 2 and 3, hydraulic cylinder 35 is energized and piston rod 40 descends so that hooks 51 may be manually secured under connector bars 52' on actuation of handles 58. Hydraulic cylinder 35 is again energized in the manner hereafter described to slowly lift piston rod 40 to the elevated position illustrated in Figure 3. Here the lead cells 17 have been forcefully removed from battery case 16.

Normally preheating of the battery 16 within an oven to loosen the sealing compound greatly facilitates the removal of the three cells 17 simultaneously from the battery case. Often, however, considerable lifting force is required before said cells are freed of the battery case.

The floating construction 40, 42 and 43, Fig. 5, provides a means for exerting a gradually increased lifting force upon said cells, so that only so much upward pressure is exerted as is necessary to remove said cells in a gradual continuous movement. This floating construction thus prevents the initial exertion of the maximum lifting force, which would often produce an uneven operation, or a sudden removal of the cells causing acid to splash on the operator, or cause fragments of the cells or battery case to fly indiscriminately.

Under some conditions the cells may stick and perhaps only one or two cells are removed. In that case hook 45 is again dropped down and the opposite forked ends 60, Fig. 8, are firmly projected into gripping engagement with either of the battery terminals 61, or any other projecting member, as for instance, a fragment of a broken connector bar 52'.

Hooks 45 are then again elevated to remove the remaining cell or cells from battery case 16.

Referring to Figures 1 and 11, an electric motor 62 is bolted to platform 11, and provided with electrical energy through wire conduit 63. Motor output shaft 64 is coupled with hydraulic pump 65, the intake end of which is joined by fluid intake pipe 66 with hand valve 67' interposed.

Pipe 66 as illustrated in Fig. 11, extends down into the liquid, preferably oil, within storage tank 67, with a suitable filter 68 secured on the intake end of pipe 66.

Pump outlet pipe 69 delivers fluid under pressure to and through adjustable pressure relief valve 70, which is set preferably for fluid delivery at approximately 500# per square inch.

Outlet pipe 71 thus delivers pressure fluid to the four-way valve housing 72, the internal construction of which forms no part of the present invention, and consequently its specific description is omitted.

The four-way valve 72 of any desired suitable construction contains a valve piston and a piston rod 73 thereon, which slidably projects through the respective ends of valve housing 72. When piston rod 73 is in a central neutral position, pressure fluid from line 71 passes directly through said valve and flows through exhaust pipe 74, supplying pressure fluid to secondary valve housing 75.

The latter four-way valve also contains a valve piston and an adjusting piston rod 76 thereon, which slidably projects through the respective ends of said valve housing. When piston rod 76 is in a central neutral position pressure fluid from line 74 passes directly through four-way valve 75 and flows through exhaust line 77, which returns the pressure fluid to fluid storage tank 67.

Similarly exhaust line 78 from the pressure relief valve 70 conducts excessive pressure exhaust fluid back to storage tank 67. Four-way valve 72 has an outlet pipe 79 which is adapted to conduct pressure fluid to the outer end of vise controlling cylinder 21, which is operable on piston 19, Fig. 11, for directing inward gripping movement of vise member 18 carried on piston rod 20.

Exhaust fluid from the other side of piston 19 is forced out of cylinder 21 through conduit 80 and is returned to valve 72 whence it is suitably exhausted through exhaust line 74.

On the other hand, on the reverse adjustments of valve piston rod 73 pressure fluid is delivered through pipe 80 to the inner end of cylinder 21 to effect releasing movement of vise grip 18. Exhaust fluid on the other side of piston 19 is forced out of cylinder 21 through conduit 79 and returned to valve 72, whence it is suitably exhausted through exhaust line 74.

If rod 73 is moved to the right pressure fluid is delivered through pipe 79 and exhausted through pipe 80 for operatively closing vise 18. If rod 73 is moved to the extreme left pressure fluid is delivered through pipe 80 and exhausted through pipe 79 for opening the vise, releasing battery 16.

For either opening or closing of vise 18 exhaust fluid is delivered out through exhaust pipe 74 for return to storage tank 67. However, it is desirable and advisable that valve rod 76 be in its neutral central position so that exhaust fluid in line 74 will pass directly through four-way valve 75 for exhausting through line 77. Consequently, during closing or opening of vise 18 rod 76 is preferably maintained in its neutral central position, otherwise exhaust flow from cylinder 21 will be delivered to one end or the other of cylinder 35 depending upon the positioning of the valve element in valve 75. Furthermore, with said latter valve element in any intermediate position, other than neutral, exhaust flow from cylinder 21 will be blocked.

It will be noted further that once vise 18 is closed or opened, it will be locked either closed or open if rod 73 is again moved to its central position. And this follows because fluid in lines 79 and 80 cannot flow in either direction.

With rod 73 in a central neutral position pressure fluid from line 71 goes directly through valve 72 and through line 74, and depending upon the positioning of rod 76 will be delivered out either of the pipes 81 or 82 which join opposite ends of vertical cylinder 35.

With rod 76 in a central position pressure fluid goes directly through valve 75 and exhausts through pipe 77. However, if rod 76 is adjusted to the left, pressure fluid goes through pipe 81 to the top of cylinder 35 to effect downward movement of piston 83, rod 40 and hooks 45 which are mounted on swivel 42. Exhaust fluid returns to valve 75 through pipe 82 and is thence exhausted through pipe 77.

On the other hand, if rod 76 is adjusted to the right, fluid is delivered through pipe 82 to elevate piston 83, Fig. 11, and rod 40 with hooks 45. Exhaust fluid then returns to pipe 81 and is suitably exhausted through line 77.

It has been described that rod 76 should be in a central position in order for vise 18 to be either opened or closed. This means that the vise cannot be released during the lifting operation or the lowering operation of hooks 45 without cutting off the main pressure flow to cylinder 35. Of course, once rod 73 is centrally positioned, locking the vise open or closed, it is then possible to operate cylinder 35.

Though exhaust fluid is flowing through line 74 during opening and closing of vise 18, it will be seen that as cylinder 21 is relatively small compared with vertical cylinder 35, that this exhaust fluid would be ineffective to operate cylinder 35 should its valve happen to be in either of its control positions. Consequently valve rod 76 should be in its neutral position during operation of cylinder 21 in order to permit exhausting of fluid therefrom directly through valve 75 for return to sump 67.

It likewise follows that with vise 18 locked in either open or closed position it is necessary to centrally position rod 73 before cylinder 35 can be effectively operated from the main source of pressure fluid. And furthermore, with cylinder 36 operating to effect vertical movements of hooks 45, cylinder 21 may not be operated without stopping the operation of cylinder 35.

Figure 12:
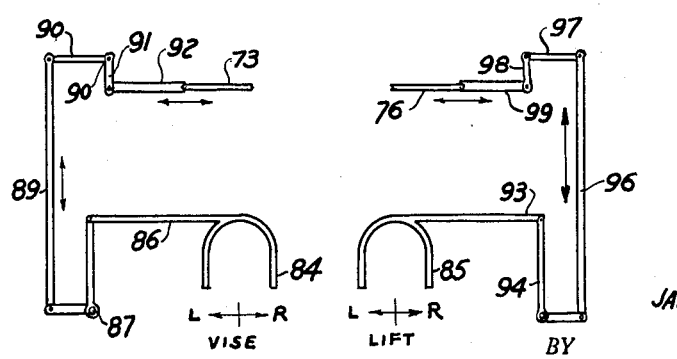
Figure 12 is a fragmentary elevational view diagrammatically illustrating the manual controls for the two four-way valves.

Referring to Figures 1 and 11 and 12, a left knee control member 84 is shown, which is movable either to the left or right from the central position shown. Likewise a right knee control member 85 is shown, which is movable either to the right or left from the central position shown.

In the manner hereafter described, with control 84 in central position, four-way valve 72 merely conducts pressure fluid from line 71 out through exhaust line 74. Also, if control 85 is in central position four-way valve 75 merely conducts pressure fluid or exhaust fluid from pipe 74 through pipe 77.

Referring now to Fig. 1, left knee control 84 is joined to rod 86, which is in turn joined to pivotal rod 87, journaled at points 88. Movement either to the left or right of control 84 effects up or down movements of shaft 89 which is joined at one end to pivotal shaft 87.

The upper end of shaft 89 is joined to pivotal cantilever 90, which in turn is joined by link 91 to horizontally reciprocal shaft 92 secured on its end to valve adjusting rod 73.

Thus movement to the left of control 84 effects a corresponding horizontal movement to the right of valve control rod 73 to cause inward gripping movement of vise 18. Movement to the right of control 84 effects a corresponding movement to the left of control rod 73 to cause outward releasing movement of vise 18.

Right knee control 85 is joined to rod 93, which is joined to pivotal rod 94 journaled at points 95. Movement either to the left or right of control 85 effects up and down movements of shaft 96, which is joined to pivotal shaft 94 similarly to the connection shown between shaft 89 and pivotal shaft 87.

The upper end of shaft 96 is joined to pivotal cantilever 97, Fig. 12, which in turn is joined by link 98 to horizontally reciprocal shaft 99 secured on its end to four-way control piston rod 76.

Thus movement to the right of control 85 effects a corresponding movement to the left of valve control rod 76, to cause a downward movement of rod 40 and cell gripping hooks 45.

Conversely movement to the left of control 85 effects a corresponding movement to the right of valve control rod 76, to cause an upward lifting movement of hooks 45.

Operation

1. Battery 16 is projected from the preheating oven and moved on rollers 14 to a central position under hooks 45, Fig. 4.
2. Knee control 84 is moved to the left and vise grip 18 moves inwardly to immovably secure battery case 16 relative to stationary grips 23.
3. Control 84 is returned to its central position locking the vise in closed position.
4. Control 85 is manually moved to the right, effecting lowering of hooks 45.
5. Control 85 is returned to its central position when hooks 85 have dropped to the proper level.
6. Handles 56 on hooks 45 are pivoted downwardly so that hook portions 51 project oppositely under the battery cell connectors 52'.
7. Control 85 is moved to the left, effecting a gradual lifting of hooks 45 to withdraw cells 17 from the battery case 16, Fig. 3.
8. Control 85 is returned to a central position to stop lifting; and cells 17 are removed from hooks 45 for salvage, by elevation of hook handles 56.
9. Control 84 is moved to the right to withdraw vise 18 releasing the empty battery case 16, permitting its disposal.
10. Control 84 is returned to its central position locking the vise in open position.

Referring to Fig. 11 auxiliary exhaust lines 100 and 101 are shown joined to the ends of four-way valve 72 for conducting any exhaust fluid which may collect in the respective ends of valve 72, returning said fluid to storage tank 67.

It will be noted that cylinder 35 is pivotally mounted at its top on eye bolt 38, thereby permitting some swinging of said cylinder within opening 41, Fig. 5, formed in platform 11. Consequently it is not necessary that battery 16 be accurately positioned below hooks 45.

Further swivel 42 is universally mounted on piston rod 40 thereby permitting rotation of hooks 45, facilitating their manual gripping of battery connector 52', or terminals 61.

Having described my invention, reference should now be had to the claim which follows for determining the scope thereof.

I claim:

In a battery dismantling machine having a battery anchoring means, an upright hollow frame, an upright standard upon the top thereof, an upright swingable cylinder pivotally mounted and suspended from its upper end upon said standard and depending downwardly through said frame, a reciprocal piston rod projecting from said cylinder, a piston on the lower end of said rod, an upright cylinder slidably receiving said piston and rod, a coiled spring between said piston and the upper end of said cylinder providing a yielding relation between said latter cylinder and piston, a horizontal support joined to and extending laterally from the lower end of said latter cylinder, and a pair of upright horizontally spaced battery cell gripping hooks swivelly suspended and depended from said horizontal support adapted for vertically withdrawing the cells from a battery.

References Cited in the file of this patent

UNITED STATES PATENTS

| Number | Name | Date |
|---|---|---|
| 84,510 | Riker | Dec. 1, 1868 |
| 1,403,962 | Jolly | Jan. 17, 1922 |
| 1,430,226 | Goodreau | Sept. 26, 1922 |
| 1,446,882 | Cox | Feb. 27, 1923 |
| 1,447,767 | De Vignier | Mar. 6, 1923 |
| 1,488,020 | Malone | Mar. 25, 1924 |
| 1,620,778 | Odom | Mar. 15, 1927 |
| 1,655,640 | Altfather et al. | Jan. 10, 1928 |
| 1,838,738 | Bradley | Dec. 29, 1931 |
| 1,869,184 | Burr | July 26, 1932 |
| 1,931,700 | Murphy et al. | Oct. 24, 1933 |
| 2,046,490 | Schurmann | July 7, 1936 |
| 2,061,369 | Pendergast | Nov. 17, 1936 |
| 2,112,466 | Maloon | Mar. 29, 1938 |
| 2,223,223 | Muller | Nov. 26, 1940 |
| 2,241,794 | Stull | May 13, 1941 |
| 2,380,329 | Price | July 10, 1945 |
| 2,615,588 | Gedris | Oct. 28, 1952 |
| 2,617,548 | Falkner | Nov. 11, 1952 |